United States Patent [19]

Kafka et al.

[11] Patent Number: 4,750,809
[45] Date of Patent: Jun. 14, 1988

[54] PULSE COMPRESSION

[75] Inventors: James D. Kafka; Thomas M. Baer, both of Mountain View; Brian H. Kolner; David M. Bloom, both of Menlo Park, all of Calif.

[73] Assignee: Spectra-Physics, Inc., San Jose, Calif.

[21] Appl. No.: 729,376

[22] Filed: May 1, 1985

[51] Int. Cl.$^4$ .............................................. G02B 27/44
[52] U.S. Cl. ........................... 350/162.17; 350/162.11; 350/349; 350/168; 350/320
[58] Field of Search .................... 350/162.11, 320, 168, 350/162.17

[56] References Cited

PUBLICATIONS

E. B. Treacy, "Compression of Picosecond Light Pulses," Phys. Lett. 28A, 34, (1968).
M. A. Duguay and J. W. Hansen, "Compression of Pulses from Mode-Locked HeNe Laser," Appl. Phys. Lett. 14, No. 1, pp. 14–15, (1969).
J. D. McMullen, "Analysis of Compression of Frequency Chirped Optical Pulses by a Strongly Dispersive Grating Pair," Appl. Opt. 18, 737, (1979).
B. Nicolaus and D. Grischkowsky, "12x Pulse Compression Using Optical Fibers," Appl. Phys. Lett. 42, pp. 1–2, (1983).
B. Nikolaus and D. Grischkowsky, "90-fs Tunable Optical Pulses Obtained by Two-Stage Pulse Compression," Appl. Phys. Lett. 43, pp. 228–230, (1983).
A. M. Johnson, R. H. Stolen and W. M. Simpson, "80x Single-Stage Compression of Frequency Doubled Nd:YAG Laser Pulses," Appl. Phys. Lett. 44, 729, (1984).
W. J. Tomlinson, R. H. Stolen, and C. V. Shank, "Compression of Optical Pulses Chirped by Self-Phase Modulation in Fibers," Optical Society of America, vol. 1, No. 2, 139, (Apr. 1984).
C. G. Dupuy and P. Bado, "Five Times Compression of Mode-Locked Argon-Ion Laser Pulses," paper TUE 2 delivered at CLEO 1984.

Primary Examiner—Bruce Y. Arnold
Attorney, Agent, or Firm—Donald C. Feix; T. M. Freiburger; Paul Davis

[57] ABSTRACT

A pulse compressor compresses a relatively long width optical pulse (of the kind which may be transform limited) to a short width pulse. The compressor includes a color generator which broadens the bandwidth of the long pulse to include any additional colors required for compression to the short pulse. The compressor also includes a grating which has a groove spacing and which is aligned with the output of the color generator at a grazing incidence angle effective for producing a compact grating structure, reduced ellipticity of the beam output from the compressor and high efficiency of light transmission through the device.

11 Claims, 3 Drawing Sheets

PULSE COMPRESSION

BACKGROUND OF THE INVENTION

1. Field of the Invention

This invention relates to methods and apparatus for optical pulse compression.

This invention relates particularly to methods and apparatus for compressing a relatively long width optical pulse of the kind which is transform limited to a shorter pulse by a compressor which incorporates a novel grazing incident delay line and which is compact and which reduces the ellipticity of the output beam and which provides high efficiency of light transmission through the compressor.

The present invention has particular application for compressing long width laser output pulses haivng pulse widths in the order of 100 picoseconds and for achieving pulse compression ratios as high as 45 to 1 by means of a dispersive delay line which has a grating spacing at a convenient distance of 10–30 centimeters (so that the compressor unit is compact) and which operates at relatively high throughput efficiencies in the range of 35 to 40 percent.

2. Description of the Prior Art

In 1968, Treacy [E. B. Treacy, "Compression of Picosecond Light Pulses," Phys. Lett. 28A, 34 (1968)] reported experiments where he compressed chirped optical pulses with a grating pair. Duguay and Hanson [M. A. Duguay and J. W. Hansen, "Compression of Pulses from Mode-locked HeNe Laser," Appl. Phys. Lett. 14, 14 (1969).] compressed 500 ps mode-locked pulses from a HeNe laser by a factor of 2 using a phase modulator and a Gires-Tournois interferometer. McMullen [J. D. McMullen, "Analysis of Compression of Frequency Chirped Optical Pulses by a Strongly Dispersive Grating Pair," Appl. Opt. 18, 737 (1979)] proposed the compression of 10 to 100 nanosecond pulses with a pair of gratings separated by 100 meters. More recently, Nikolaus and Grischkowsky [B. Nicolaus and D. Grischkowsky, "12× Pulse Compressin Using Optical Fibers," Appl. Phys. Lett. 43, 228 (1983) and B. Nikolaus and D. Grischkowsky, "90-fs Tunable Optical Pulses Obtained by Two-State Pulse Compression," Appl. Phys. Lett. 43, 228 (1983)] used the effect of self phase modulation in a single mode optical fiber to chirp an optical pulse, and then compressed the pulse using a grating pair. Johnson et al [A. M. Johnson, R. H. Stolen and W. M. Simpson, "80× Single-Stage Compression of Frequency Doubled Nd:YAG Laser Pulses," Appl. Phys. Lett. 44, 729 (1984)] have used this technique with a grating separation of 7 meters to compress the 33 ps pulses from a frequency-doubled, mode-locked CW Nd:YAG laser by a factor of 80. Tomlinson et al [W. J. Tomlinson, R. H. Stolen, and C. V. Shank, "Compression of Optical Pulses Chirped by Self-Phase Modulation in Fibers," Optical Society of America Vol. 1, No. 2, 139 (April 1984)] have calculated the grating spacing for compression of 60 picosecond pulses to be between 12 meters and 37 meters. Tomlinson et al have proposed several techniques for reducing the physical space required for grating separation. These techniques include the use of finer groove spacings, folding theo ptical path, and using the compressor in double pass. Dupuy and Bado [C. G. Dupuy and P. Bado, "Five Times Compression of Mode-Locked Argon-Ion Laser Pulses," Taper TuE2, CLEO 1984] have compressed 100 ps pulses using a 1.5 meter grating separation.

All of these publications are incorporated by reference in this patent application in accordance with §608.01(p) of the *Manual of Patent Examining Procedure* of the U.S. Patent and Trademark Office.

In the prior art, as noted above, the compression of very long pulses has presented a problem because it has been generally thought that the compression of very long pulses required very big separations between gratings of a grating pair used for producing compression of the very long pulse.

Another problem of the prior art has been choosing a solution for the gratings which enables recovery of most of the light refracted to the correct order so that an unacceptable amount of light is not thrown away in the process.

SUMMARY OF THE PRESENT INVENTION

It is an important object of the present invention to compress a relatively long width optical pulse to a shorter width pulse in a way that produces both high efficiency and large compression effect in a convenient distance.

The present invention comprises pulse compression apparatus and methods for efficiently compressing a relatively long width optical pulse, of the kind which may be transform limited, to a shorter width pulse.

The pulse compression apparatus and method of the present invention include color generator means for generating from the long pulse an output which has a bandwidth that is broadened to include any additional colors required for compression of the long pulse to the short pulse.

The present invention also includes dispersive delay line means for compressing the output of the color generator means to produce the short width pulse. The dispersive delay line means include grating apparatus aligned with the beam from the output of the color generator means at a grazing incidence for producing a compact grating structure, reduced ellipticity of the beam output from the dispersive delay line means and high efficiency of light reflected by the grating into the appropriate order.

In a specific embodiment of the present invention the pulse compressor apparatus and method enable pulses having pulsewidths on the order of 100 picoseconds to be compressed at pulse compression ratios of 45:1 with gratings having effective spacings of 10 to 30 centimeters.

The present invention also enables a large amount of compression to be obtained with a grating pair that is not only compact but also efficient.

Pulse compression apparatus and methods which embody the features and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
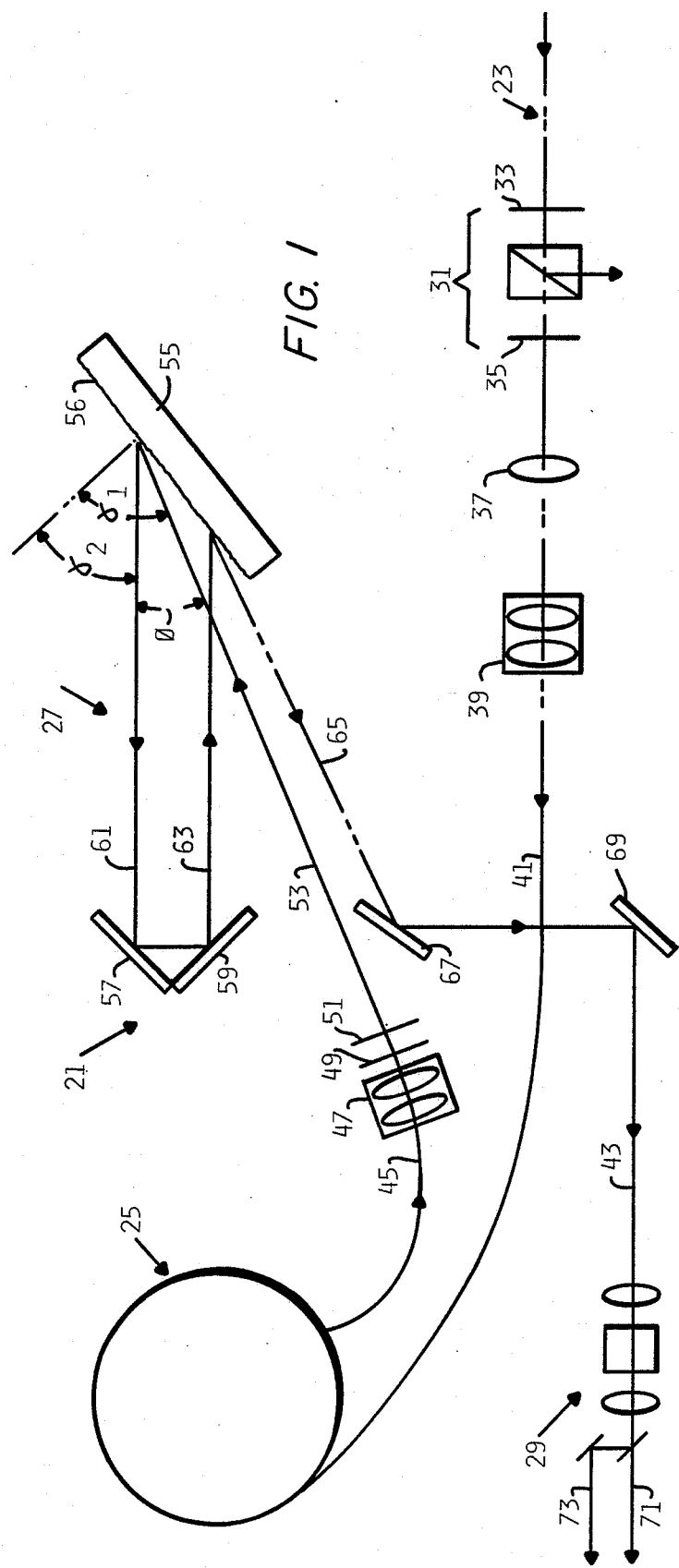
FIG. 1 is a diagrammatic plan view of a pulse compressor constructed in accordance with one embodiment of the present invention.

A pulse compressor apparatus constructed in accordance with one embodiment of the present invention is indicated by the general reference numeral 21 in FIG. 1.

As illustrated in FIG. 1 the pulse compressor 21 has an inlet 23 for transmitting the long width optical pulse into the compressor apparatus 21, a color generator means 25 for generating any additional colors required for compression of the long pulse to the shorter pulse, a dispersive delay line 27 for compressing the output of the color generator to the short width pulse and an optional optical group 29 for producing a multiple frequency output.

In the embodiment illustrated in FIG. 1 the pulse to be compressed enters a polarizer 31. The polarizer 31 has an inlet half-wave plate 33 and an outlet quarter-wave plate 35.

A lens 37 adjusts the size of the incoming beam.

A lens assembly 39 focuses the incoming beam.

The focused beam is transmitted into the inlet end 41 of a fiber optic. The fiber optic serves as a generator of additional frequencies (colors) in the vicinity of the operating frequency. The fiber optic produces this function because the index of the fiber optic increases with intensity of the beam. The center of the pulse is more intense so that the center of the pulse sees a higher index. When the index of refraction changes, the instantaneous frequency at that portion of the pulse is modified proportionally to the negative derivative (time rate of change or slope) of the index. As such, the leading edge of the pulse produces new frequencies below the central operating frequency while the trailing edge (opposite slope) produces new frequencies above the central operating frequency. Because of this effect, the instantaneous frequency sweeps (or "chirps") through the pulse in a manner that is known in the prior art.

The color generator 25 generates an output having a bandwidth broadened to include any additional colors which are required for compression of the long pulse (entering at the inlet 23) to the greatly shortened pulse exiting the compressor apparatus on the path 43.

The pulse on the line 45 at the outlet of the color generator 25 needs to have the polarization of the beam reconstructed. An objective lens assembly 47 collimates the beam, and two quarter-wave plates 49 and 51 are used to reconstruct the polarization of the beam before transmitting the beam to the dispersive delay line 27.

The beam is transmitted from the outlet of the quarter-wave plate 51 along the path 53 toward a grating 55. The beam is diffracted from the face 56 of the grating 55 along the line 61; and, in the specific embodiment illustrated in FIG. 1, onto a first mirror 57 which is arranged at a right angle with respect to a second mirror 59. The mirrors 57 and 59 are arranged at right angles to one another and at angles with respect to the grating 55 so as to reflect a beam 63 back onto the grating along a path parallel to the path 61. The light traveling along the path 63 is diffracted from the grating along the path 65 and may be redirected by mirrors 67 and 69 as illustrated into the inlet of the optional optical group 29.

In a second embodiment of the invention (which will now be described with reference to FIGS. 1, 4 and 5), the beam 65 is displaced upwardly (as viewed in FIG. 1) and is redirected back towards the grating 56 (parallel to the beam 65) and is caused to make a second pass through the dispersive delay line 27 (while being maintained parallel and displaced upwards of the beams 63, 61 and 53) before being ultimately transmitted to the optical group 29.

Figure 4:
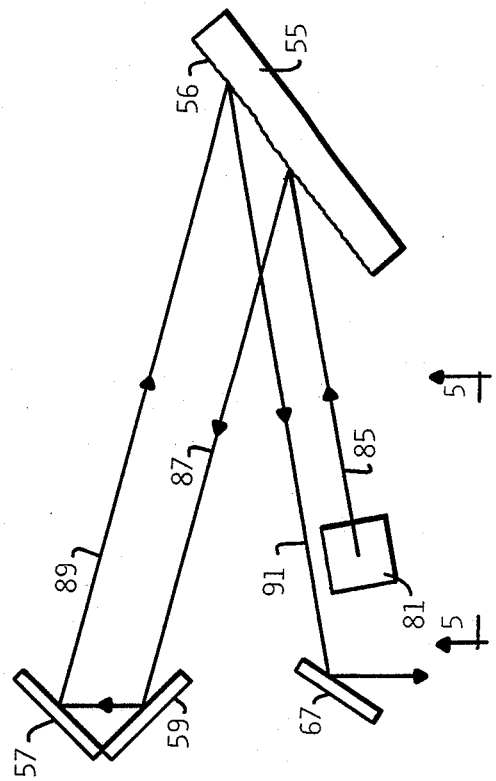
FIG. 4 is a view like FIG. 1 but showing a second embodiment of the invention which has a single grating face for four diffractions of the beam.
Figure 5:
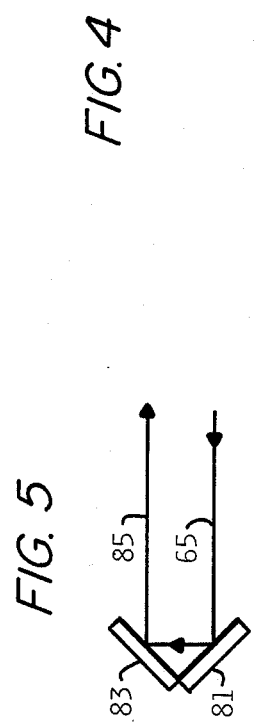
FIG. 5 is an enlarged, fragmentary view taken along the line and in the direction indicated by the arrows 5—5 in FIG. 4.

In this second embodiment, a second set of mirrors 81 and 83 are arranged, as shown in FIG. 5 and in FIG. 4, to intercept the beam 65 and to redirect the beam, as shown in FIG. 4, for a second pass through the dispersive delay line 27. In this embodiment the beam 65 is redirected as beam 85 onto the grating. The beam 85 is diffracted off the grating face 56 as the beam 87, and the mirrors 59 and 57 redirect the beam, as beam 89, onto the grating face 56. The beam leaves the face 56 as beam 91.

In this embodiment the mirror 67 has been moved slightly upwardly and sideways (from the position illustrated in FIG. 1 to the position illustrated in FIG. 4) to receive the beam 91 and to redirect the beam 91 to the mirror 69, as before.

This second embodiment uses a single grating face for all four diffractions of the beam.

This can have some advantages for particular applications. For example, the double pass through the dispersive delay line 27 yields a spatially round beam which can be preferable for generation of second harmonic power.

The optical group 29 is effective to produce an output 73 at a wavelength one half that of the wavelength on the line 71.

In a specific embodiment of the present invention, where the wavelength of the incoming light at the inlet 23 is 1064 nanometers, the wavelength on the outlet line 71 is also 1064 nanometers, and the wavelength of the light on the output 73 is 532 nanometers.

As illustrated in FIG. 1, the angle that the path of the incoming beam 53 makes with respect to the normal to the grating is $\gamma_1$, the angle between the normal to the grating and the path 61 is $\gamma_2$, and the difference between the angles $\gamma_1$ and $\gamma_2$ is phi.

In accordance with the present invention the dispersive delay line 27 achieves a compact and efficient design using a unique grazing incidence technique.

To achieve high eficiency the grating is used close to the Littrow condition, phi equals zero (which is illustrated by the dotted lines and the corresponding legend in FIG. 2 and which will be descried in more detail below). For a given wavelength it is possible to choose a grating such that the Littrow condition is satisfied at grazing incidence (e.g. 80 degrees). When the grating is employed at a steep grazing incidence angle (about 60° to 89°), the distance traveled by the light beam between the grating surfaces can be reduced by two orders of magnitude. In addition, the ellipticity of the output beam is greatly decreased.

Figure 2:
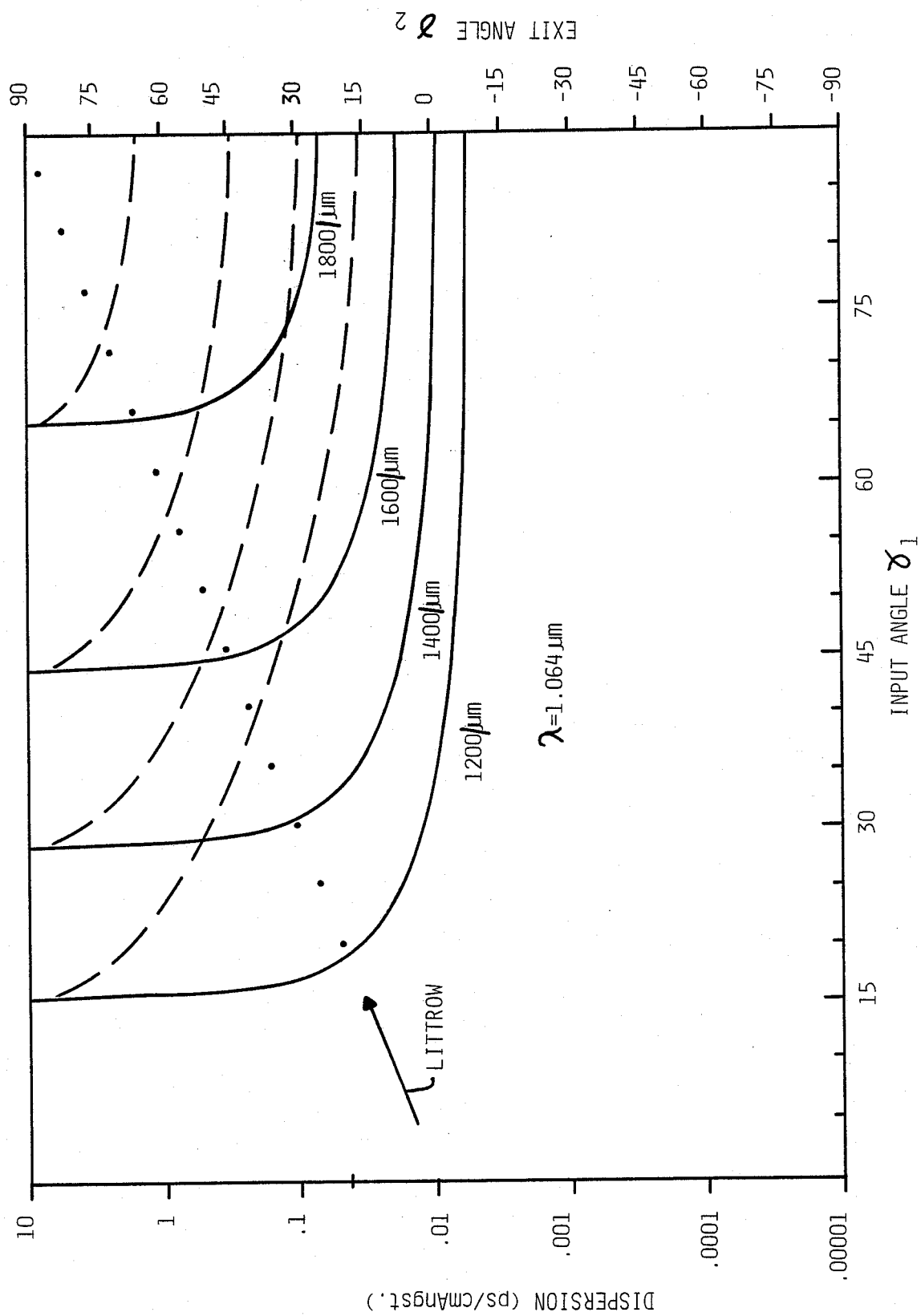
FIG. 2 is a graph of dispersion versus input angle for the compressor shown in FIG. 1 and operating at an input wavelength of 1064 nanometers.

FIG. 2 is a graph showing the relationship between the dispersion and the input angle gamma$_1$ (that the incoming beam 53 makes with the normal) for curves (gratings) having the number of grooves per millimeter indicated and for an incoming pulse having a wavelength of 1064 nanometers.

This FIG. 2 also illustrates the Littrow condition (see the arrow marked with the legend marked "Littrow" and the dotted line indicated by the arrow).

Figure 3:
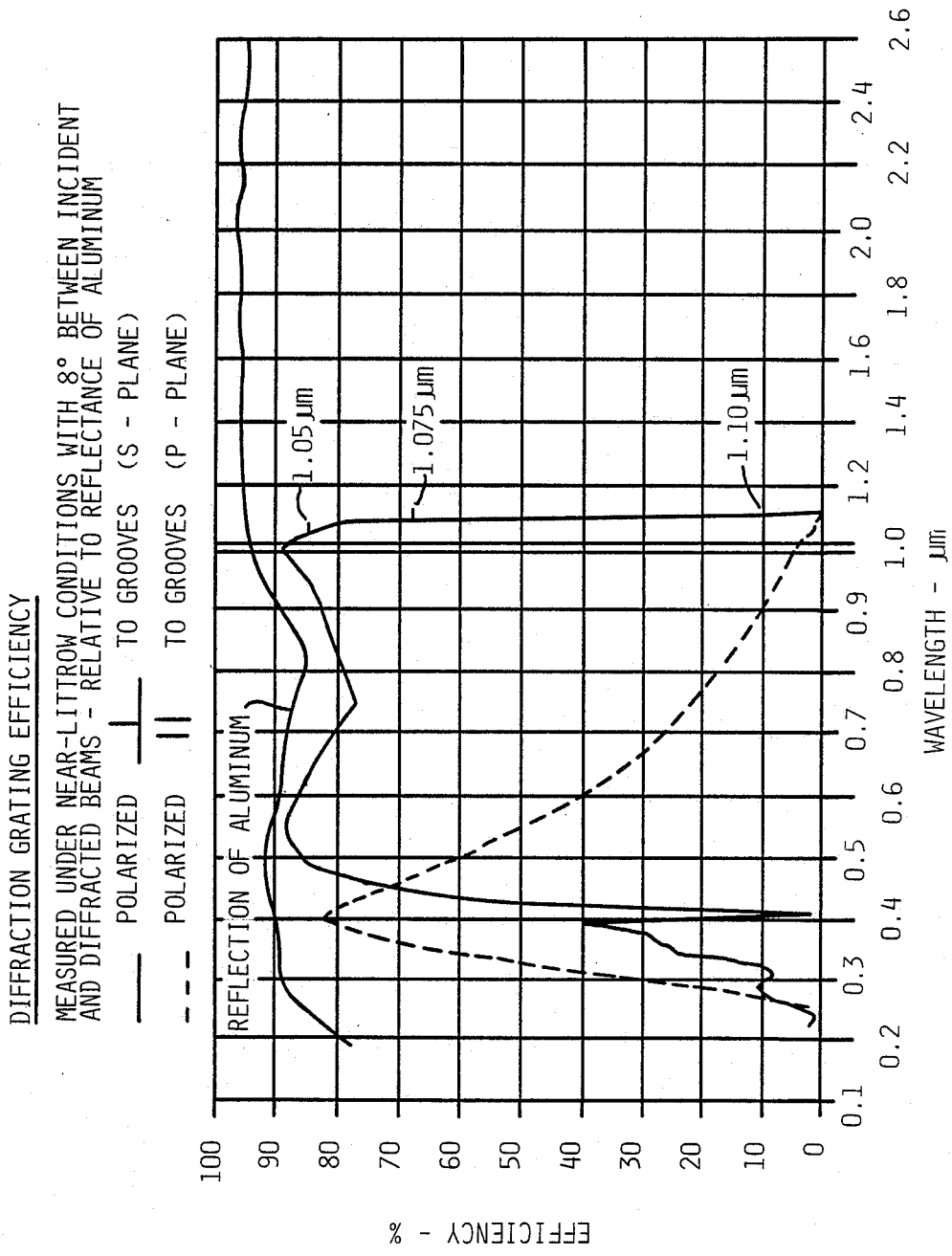
FIG. 3 is a graph of diffraction grating efficiency for a grating having 1800 grooves per millimeter.

FIG. 3 shows the diffraction grating efficiency measured under near Littrow conditions for a grating having 1800 grooves per millimeter.

The plot of the curves in FIG. 2 makes it quite clear that for an input angle of 70°, as an example, there are two orders of magnitude increase in dispersion effect for only a small change in the number of lines on the grating.

This FIG. 2 also clearly illustrates the functional relationship of incident angle to reducing the spacing between the gratings. The plot of the curves illustrate graphically that it is possible to do orders of magnitude better by coming in at an appropriate angle with a proper grating.

By using the system and analysis of the present invention it is possible to have a compact system for compressing long pulses, longer than 100 picoseconds, for example. This is a benefit because there are YAG lasers which produce reasonably long pulses and reasonably high power and which are commercially available; so it is very useful to compress such long pulses.

In accordance with the present invention a first step is to pick a diffraction grating line spacing such that the dispersion vs. input angle curve has a relatively flat plateau and a high enough dispersion to be of interest.

For the 1064 nanometer wavelength, this requires a grating groove spacing of 1600 lines per millimeter or more.

Secondly, the present invention permits scaling the efficiency curve for that grating and for the wavelengths involved so that it is possible to operate on a relatively high part of the efficiency curve.

The efficiency curve is scaled by choosing the appropriate groove spacing since the peak efficiency scales with the product of wavelength and groove frequency.

For the 1064 nanometer wave-length the optimal efficiency would be at 1700 lines per millimeter, but one can use almost any groove frequency less than 1800 down to 800 or 900 lines per millimeter.

Another feature of the present invention relates to the size (diameter) of the beam itself. The size of the beam has points of contact with the grating and the angle of incidence on the grating. A very small diameter beam tends to diverge rapidly. This gives a large range of angles of incidence that could become unacceptable if there is enough divergence to get over the very steep part of the dispersion versus the input angle for a particular grating curve. It is possible to get around this problem by making or selecting a beam size.

In accordance with the present invention the beam is prepared large enough so that its angular spread does not cause trouble with respect to the amount of dispersion that is needed, i.e., this avoids the following problem: For a small beam, diffraction causes a large number of incident angles to be present, and in accordance with FIG. 2, this variation in angle causes a corresponding variation in dispersion, which is undesirable.

Because there is an inverse relationship between the size of the beam and how much it diverges, it is possible to put an arbitrary limit, such as saying that the pulse will not be permitted to double in width.

In one embodiment of the invention the waist size of the beam needs to be about 200 or 300 microns minimum diameter to make sure that some of the energy, a very small amount of the energy with diverging angular components, does not double or broaden out to twice the optimum pulsewidth.

This is also a reason for working on a flatter part of the curve. Doing this reduces the restriction on the angular divergence.

In one specific embodiment of the present invention a Spectra-Physics model 3000 continuous wave modelocked Nd:YAG laser was used to generate 80 picosecond pulses at a repetition rate of 82 MHz with 8 watts of average power at the inlet 23 of the system shown in FIG. 1. Although the coupling efficiency was typically 50 percent, the output power from the fiber was limited to 1 watt by Raman generation. After propagating through 300 meters of single mode optical fiber the pulsewidth remained unchanged, but the bandwidth broadened from 0.3 Angstroms to 35 Angstroms.

The dispersive delay consisted of a single 1800 line per millimeter grating and a roof prism reflector separated by 17 centimeters. The shortest pulse observed was 1.0 picoseconds; however, typical pulsewidths were 1.8 picoseconds assuming a Gaussian pulse shape.

In this particular example 500 milliwatts of power at 1064 nanometers was frequency doubled using a 5 millimeter KTP cruystal, and 40 milliwats of power at 532 nanometers was obtained.

In another embodiment the dispersive delay line 27 was optimized to achieve maximum throughput and 3.4 watts of average power were obtained at 1064 nanometers usign a single pass grating pair (FIG. 1). Using a double pass grating pair (FIGS. 4 and 5), 2.8 watts of power was obtained. Using a five millimeter KTP crystal 1.25 watts of second harmonic power was generated, yielding a conversion efficiency of 45 percent. In this configuration, the pulsewidth broaded to 3.5 picoseconds at 532 nanometers.

The present invention enables a compact pulse compressor to be built using a novel grazing incidence technique.

While we have illustrated and described the preferred embodiments of out invention, it is to be understood that these are capable of variation and modification, and we therefore do not wish to be limited to the precise details set forth, but desire to avail ourselves of such changes and alterations as fall within the purview of the following claims.

What is claimed is:

1. Pulse compressor apparatus for compressing a relatively long width optical pulse of the kind which may be transform limited to a shorter width pulse, said apparatus comprising, color generator means for generating from the long pulse an output beam having a bandwidth broadened to include any additional colors required for compression of the long pulse to the shorter pulse, and dispersive delay line means for compressing the output of the color generator means to the short width pulse.

said dispersive delay line means including grating means aligned with the beam from the output of the color generator means at a grazing incidence angle of about 60 degrees to 89 degrees between the beam and the normal to the grating means, effective for producing a compact grating means structure, and at the same time with a groove spacing selected to operate in near-Littrow condition, i.e. wherein the angle between the beam incident on the grating means and the beam diffracted from the grating means is small, the groove spacing and near-Littrow condition providing greater than 80% efficiency of light transmission through the grating means.

2. The invention defined in claim 1 wherein the color generator means include an optical fiber.

3. The invention defined in claim 1 wherein the wavelength of the optical pulse to be compressed is 1064 nanometers and the grating means have 1700 to 1800 lines per millimeter.

4. The invention defined in claim 1 wherein the width of the pulse to be compressed is on the order of 100 picoseconds and the spacing between the grating and a beam redirection means which returns the beam toward the grating is less than 40 centimeters.

5. The invention defined in claim 1 wherein the dispersive delay line means include a single grating and a roof prism reflector.

6. The invention defined in claim 1 wherein the dispersive delay line means includes a single grating and two roof prism reflectors, so that the beam is refracted four times off the grating and produces essentially a spatially round beam.

7. The invention defined in claim 1 wherein the grating means are aligned with the beam from the output of the color generator at a grazing incidence angle which permits working far enough back on the flat part of the dispersion curve to accommodate the spread of angles inherent in the beam containing the optical pulse.

8. A method compressing a relatively long width optical pulse of the kind which may be transform limited to a shorter width pulse, said method comprising,
  generating in a color generator an output beam having a bandwidth broadened to include any additional colors required for compression of the long pulse to the shorter pulse, and
  compressing in a dispersive delay line structure the output of the color generator,
  the compressing step including directing the beam from the color generator onto grating means, and selecting a groove spacing such that, for a given wavelength beam, the exit angle of the beam from the grating is steep, in the range of about 60 degrees to 89 degrees, and the grating operates in near-Littrow condition, i.e. wherein the angle between the beam incident on the grating means and the beam diffracted from the grating means is small, whereby compactness of the dispersive delay line is achieved through steepness of the exit angle, and wherein the groove spacing is selected to provide optimum efficiency, greater than about 80%.

9. The method of claim 8, wherein the given wavelength is 1064 nanometers and the grating means has a groove spacing of about 1600 to 1800 lines per millimeter.

10. A compact pulse compression apparatus for compressing a 1064 nanometer optical pulse of relatively long widths produced by a CW mode-locked Nd-YAG laser at high efficiency of beam transmission, comprising,
  color generator means for generating from the long pulse an output beam having a bandwidth broadened to include any additional colors required for compression of the long pulse to the shorter pulse, and
  dispersive delay line means for compressing the output of the color generator means to the short width pulse,
  the dispersive delay line means including grating means having a groove spacing of 1600 to 1800 lines per millimeter and being aligned with respect to the beam from the output of the color generator means at a grazing incidence angle of about 60 degrees to 89 degrees between the beam and the normal to the grating means, for producing a compact dispersive delay line means, and with the groove spacing to allow grazing incidence and to produce grating means operation in near-Littrow condition, i.e. wherein the angle between the beam incident on the grating means and the beam diffracted from the grating means is small, the groove spacing and near-Littrow condition providing high efficiency of light transmission through the grating means.

11. The pulse compression apparatus of claim 10, wherein the grating means has a groove spacing of about 1700 lines per millimeter and the incidence angle is about 70 degrees.

* * * * *